(12) United States Patent
Rzyski et al.

(10) Patent No.: US 6,745,020 B2
(45) Date of Patent: Jun. 1, 2004

(54) DIRECT DOWNCONVERSION RECEIVER

(76) Inventors: Eugene Rzyski, 2 Benjamin, Irvine, CA (US) 92620; Todd Wangsness, 3961 Acacia St., Irvine, CA (US) 92606

( * ) Notice: Subject to any disclaimer, the term of this patent is extended or adjusted under 35 U.S.C. 154(b) by 0 days.

(21) Appl. No.: 10/231,813

(22) Filed: Aug. 29, 2002

(65) Prior Publication Data

US 2004/0043743 A1 Mar. 4, 2004

(51) Int. Cl.$^7$ ................................................. H04B 1/26
(52) U.S. Cl. ........................ 455/323; 455/316; 455/130; 455/141
(58) Field of Search ................................ 455/323, 324, 455/316, 130, 141, 147, 161.1, 326; 375/324, 316, 345, 349, 272, 273, 232, 334, 344, 350

(56) References Cited

U.S. PATENT DOCUMENTS

| | | | | |
|---|---|---|---|---|
| 4,944,025 A | * | 7/1990 | Gehring et al. | 455/207 |
| 5,263,194 A | * | 11/1993 | Ragan | 455/316 |
| 5,617,451 A | * | 4/1997 | Mimura et al. | 375/340 |
| 5,943,370 A | * | 8/1999 | Smith | 375/334 |
| 6,208,850 B1 | * | 3/2001 | Tolson | 455/317 |
| 6,236,690 B1 | * | 5/2001 | Mimura et al. | 375/334 |
| 6,275,542 B1 | * | 8/2001 | Katayama et al. | 375/322 |
| 6,374,086 B1 | * | 4/2002 | Tolson | 455/73 |
| 6,393,372 B1 | | 5/2002 | Rzyski | |

* cited by examiner

Primary Examiner—Sonny Trinh
(74) Attorney, Agent, or Firm—MacPherson Kwok Chen & Heid LLP; Jon W. Hallman

(57) ABSTRACT

A direct downconversion receiver combines a received RF signal and a local oscillator (LO) signal to form a combined signal. The local oscillator signal is also phase-shifted by approximately 90 degrees to form a quadrature signal. A mixer forms the product of the combined signal and the quadrature signal to produce a baseband output signal.

14 Claims, 3 Drawing Sheets

DIRECT DOWNCONVERSION RECEIVER

FIELD OF INVENTION

This invention relates to direct downconversion receivers and more particularly to a direct downconversion receiver architecture that mitigates the DC offset component.

BACKGROUND

Conventional radio receivers typically employ a superheterodyne architecture. In such architecture, the receiver down converts the received RF signal to an intermediate frequency (IF). After additional processing, the IF signal is then converted to a baseband signal. In contrast, a direct down conversion receiver translates the received RF signal to baseband in just one stage of processing. Because direct down conversion receivers do not translate the received RF signal to an intermediate frequency, they are also known as "zero-IF" receivers. Given that each processing stage in a receiver inevitably introduces noise and requires more components, much effort has been directed to designing direct down conversion receivers.

Despite the attractive signal-to-noise and manufacturing advantages of a direct down conversion receiver, most applications such as wireless handsets continue to use a superheterodyne architecture because of DC offset problems arising from local oscillator (LO) self-mixing, LO coupling back to a low noise amplifier (LNA), mixer 2nd order distortion, and envelope detection of interfering AM signals. Also significant issues arise from the contribution of LO 1/f noise, reciprocal mixing, and LO spurious signals.

LO self-mixing arises in a direct down conversion receiver as follows. The mixer receives in one port the received RF signal at a carrier frequency and receives in the other port the LO signal also at or near the carrier frequency. This local oscillator signal is typically much higher power than the received RF signal and inevitably reactively couples into the RF port and thus self mixes. In this self-mixing process, a sinusoid such as the LO signal is squared and produces a DC offset component. Such a DC offset component at baseband will interfere with the demodulation of digital signals, particularly at the higher throughputs common in modern digital communication systems.

Accordingly, there is a need in the art for an improved direct down conversion receiver architecture that alleviates the DC offset problem.

SUMMARY

In accordance with a first aspect of the invention, a direct downconversion receiver includes an oscillator for providing a local oscillator signal. A phase-shifter is configured to receive the LO signal and provide a phase-shifted signal that is approximately 90 degrees out of phase with the LO signal. The receiver combines the LO signal with an incoming RF signal and provides the combined signal to a first input port of a mixer. The mixer includes a second port for receiving the phase-shifted signal such that the mixer provides a baseband output signal that is the product of the signals entering the first input port and the second input port.

In accordance with another aspect of the invention, a method is provided to directly downconvert an RF signal. In this method, the RF signal is combined with an LO signal to produce a combined signal. The LO signal is also phase-shifted by approximately 90 degrees to provide a quadrature signal. The quadrature signal and the combined signal are multiplied together to produce a baseband output signal.

The invention will be more fully understood upon consideration of the following detailed description, taken together with the accompanying drawings.

DETAILED DESCRIPTION

Figure 1:
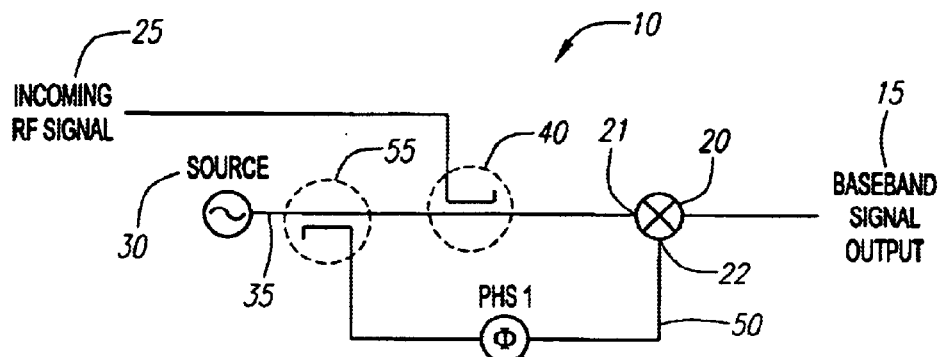
FIG. 1 is a block diagram of a direct downconversion receiver according to one embodiment of the invention.

FIG. 1 is a block diagram of a direct downconversion receiver 10 that mitigates the DC offset component in a baseband signal output 15 from a mixer 20. Mixer 20 may be either a double sideband or single sideband mixer whose baseband signal output represents the product of the inputs to its RF input port 21 and local oscillator (LO) input port 22. Direct downconversion receiver 10 receives an incoming RF signal 25 at a carrier frequency that couples to RF input port 21 of mixer 20. It will be appreciated by those of ordinary skill in the art that incoming RF signal 25 is received at an antenna (not illustrated) and may be processed by filters and low noise amplifiers (not illustrated) before coupling to mixer 20 as conventionally practiced in prior art direct downconversion receivers. Direct downconversion receiver 10 includes a signal source 30, which may be a voltage-controlled oscillator (VCO) or similar generator of a suitable LO output. For example, this may be a sinusoid output 35. Those of ordinary skill in the art will appreciate that the type of LO output will depend upon the particular modulation present in the incoming RF signal 25. Before coupling to the RF input port of mixer 20, sinusoid output 35 and incoming RF signal 25 are combined through RF coupler 40. The design of RF coupler 40 depends upon the type of waveguides (such as stripline, coaxial cable, or microstrip) chosen to propagate incoming RF signal 25 and sinusoid output 35 and is well known to those of skill in the art. In turn, the type of waveguides implemented depends upon the carrier frequency, signal power levels, space concerns, and other well-known design choices.

In addition to coupling to RF input port 21, sinusoid output 35 also couples to an RF coupler 55. It will be appreciated that a signal splitter may be used in place of RF coupler 55. Through this RF coupler 55, sinusoid output 35 couples to a phase-shifter 45. Phase-shifter 45 is configured to phase-shift sinusoid output 35 by 90° to provide a quadrature local oscillator signal 50 to LO input port 22 of mixer 20. Although phase-shifter 45 is shown as a discrete component, it may be integral with mixer 20. Such a design would minimize the opportunity for quadrature local oscillator signal 50 to couple to RF input port 21 and thereby self mix and produce an undesirable DC offset component in baseband signal output 15. Alternatively, phase-shifter 45 may be located as close as possible to LO input port 22 of mixer 20 to minimize radiative or reactive coupling of quadrature local oscillator signal 50 to RF input port 21.

Advantageously, sinusoid output 35 and quadrature local oscillator signal 50 do not produce a DC offset component in baseband signal output 15 as shown by the following mathematical derivation. If $f_r(t)$ represents the input to RF port 21, $f_1(t)$ represents the input to LO input port 22, and $f_x(t)$ represents baseband signal output 15, then:

$$f_x(t)=(mf_r(t))*(nf_1(t))$$

where m, n= . . . , −2, −1, 0, 1, 2, . . . In the following derivation, it will be assumed that m=n=1 for simplicity, however, analogous results occur for the other values. If incoming RF signal 25 is represented by $f_{RF}(t)=A\cos(\omega_{RF}t+\phi_{RF})$ and sinusoid output 35 by $B\cos(\omega_{LO}t)$, where $\omega_{RF}$ is the carrier frequency and $\phi_{RF}$ is the carrier phase, then it follows that:

$$f_r(t)=A\cos(\omega_{RF}t+\phi_{RF})+B\cos(\omega_{LO}t)$$

Given this representation for sinusoid output 35, quadrature local oscillator signal may, in an ideal case, be represented as $B\sin(\omega_{LO}t)$. However, to allow for phase shift errors and amplitude losses or gains, quadrature local oscillator signal will be represented by $C\cos(\omega_{LO}t-\phi_b)$, where $\phi_b$ is the phase shift provided by phase-shifter 45. Given these representations and letting $\phi_b=90°-\epsilon_b$, where $\epsilon_b$ is the quadrature error term, it follows that $f_x(t)$ may be expressed as the sum of a DC offset term, a double frequency term, a DC frequency offset term, and a double frequency offset plus offset term such that:

$$\begin{array}{cc} \text{DC Offset Term} & \text{Double Frequency Term} \\ f_x(t) = (AB/2)(\cos(\epsilon_b - 90°)) + (AB/2)(\cos(2\omega_{LO}t + 90° - \epsilon_b)) \end{array}$$

Frequency Offset Term +

$$(BC/2)\cos((\omega_{RF}-\omega_{LO})t+\varphi_{RF}-90°+\epsilon_b)+$$

Double Frequency Plus Offest Term $$(BC/2)\cos(2(\omega_{RF}+\omega_{LO})t+\varphi_{RF}+90°-\epsilon_b)$$

The double frequency (high frequency) terms may be readily filtered or otherwise removed. If phase-shifter 45 is configured to keep the quadrature error term either zero or very small, then the DC offset term becomes zero or insignificant. This leaves just the frequency offset term which represents the downconverted incoming RF signal offset in frequency from DC by the difference between $\omega_{RF}$ and $\omega_{LO}$ such that baseband signal output from receiver 10 may be represented as $(BC/2)\cos((\omega_{RF}-\omega_{LO})t+\phi_{RF}-90°+\epsilon_b)$.

Figure 2:
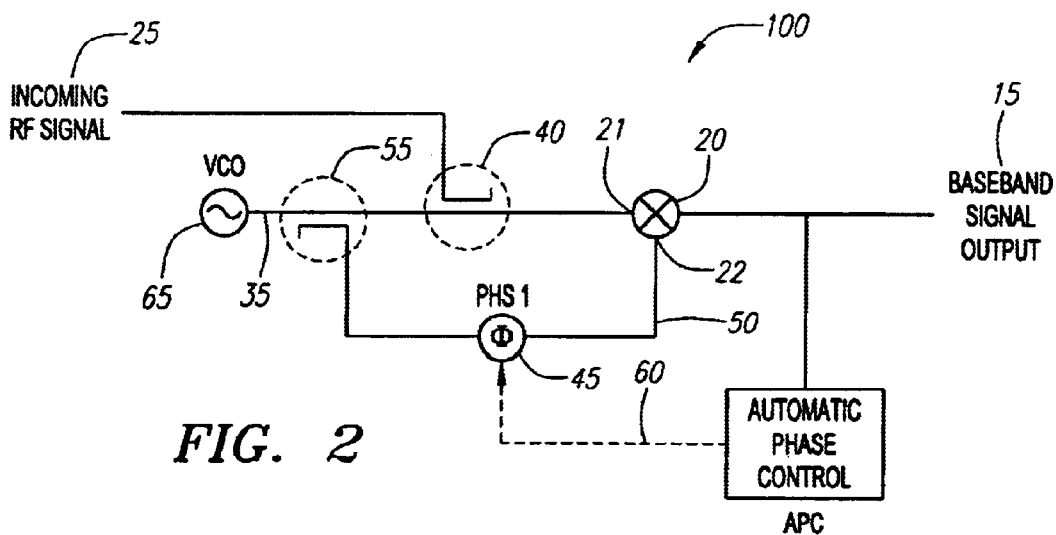
FIG. 2 is a block diagram of a direct downconversion receiver that includes feedback control of its phase-shifter according to one embodiment of the invention.

The DC offset term is mitigated only when the quadrature error term $\epsilon_b$ is zero or insignificant. Note that if $\epsilon_b$-90°<-90°, the DC offset term becomes negative. Conversely, if $\epsilon_b$-90°>-90°, the DC offset term becomes positive. Turning now to FIG. 2, this property creates the means for a phase-shift feedback loop 60 to control phase-shifter 45 to keep the quadrature error term $\epsilon_b$ sufficiently small so as to mitigate the DC offset component in baseband signal output 15. For example, phase-shift feedback loop 60 may form a "bang-bang" type of control loop such that if the DC offset component is positive, phase-shifter 45 is adjusted to phase delay quadrature local oscillator signal by an additional predetermined amount of delay, e.g., by 1°. Conversely, if the DC offset component is negative, phase-shifter 45 is adjusted to phase advance quadrature local oscillator signal by a predetermined amount, e.g., by 1°. Rather than use a predetermined amount of phase shift, adaptive or fuzzy control methods may be implemented such that the amount of phase shift would not be predetermined. For the direct downconversion receiver 100 illustrated in FIG. 2, signal source 30 is represented by a voltage-controlled oscillator (VCO) 65.

Figure 3:
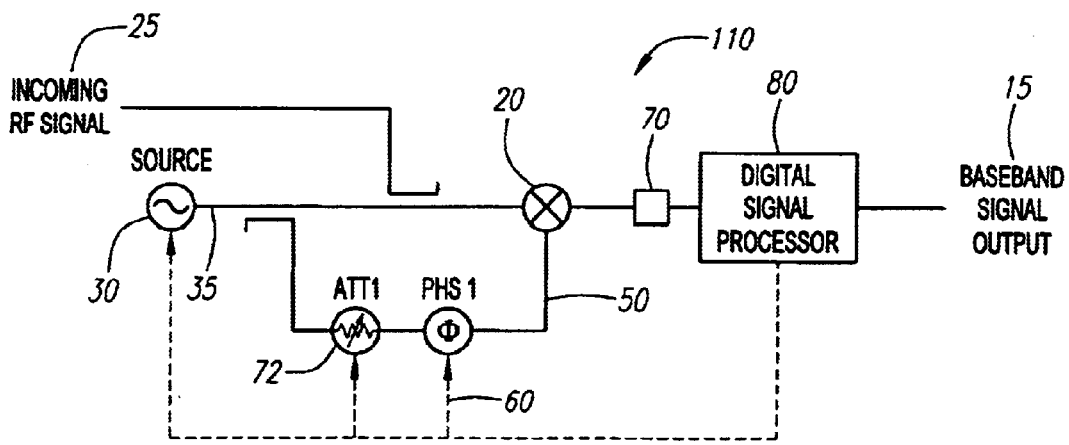
FIG. 3 is a block diagram of a direct downconversion receiver that includes a variable attenuator in the local oscillator path of its mixer according to one embodiment of the invention.

Because baseband signal output 15 is an analog signal, phase-shift control loop 60 may be implemented in the analog domain. Alternatively, baseband signal output 15 may be digitized and phase-shift control loop 60 may be implemented in the digital domain. Turning now to FIG. 3, a direct downconversion receiver 110 includes an analog-to-digital converter 70 to digitize baseband signal output 15. A digital signal processor 80 receives the digitized baseband signal output 15 (note that low pass or band pass filters for removing the double frequency components are not illustrated) and may perform a discrete Fourier transform (DFT) to detect the DC frequency offset term and the DC offset term. The sampling frequency of the DFT may be chosen to make the DFT window of a size appropriate to detect the DC frequency offset term without aliasing. The appropriate sampling frequency depends upon the difference between the carrier frequency $\omega_{RF}$ and the sinusoid output/local oscillator frequency $\omega_{LO}$. For example, in a PCS application $\omega_{RF}$ may be 1.8 GHz such that $\omega_{LO}$ may be set at $\omega_{RF}$ minus an offset such as 20 MHz. The DFT window could then be set at approximately 25 MHz. In addition to detecting the DC frequency offset component, the DFT may also be used to detect the size and phase (positive or negative) of the DC offset term. The detected DC offset term may then be used in phase-shift control loop 60 to adjust phase-shifter 45 as described previously.

Figure 4:
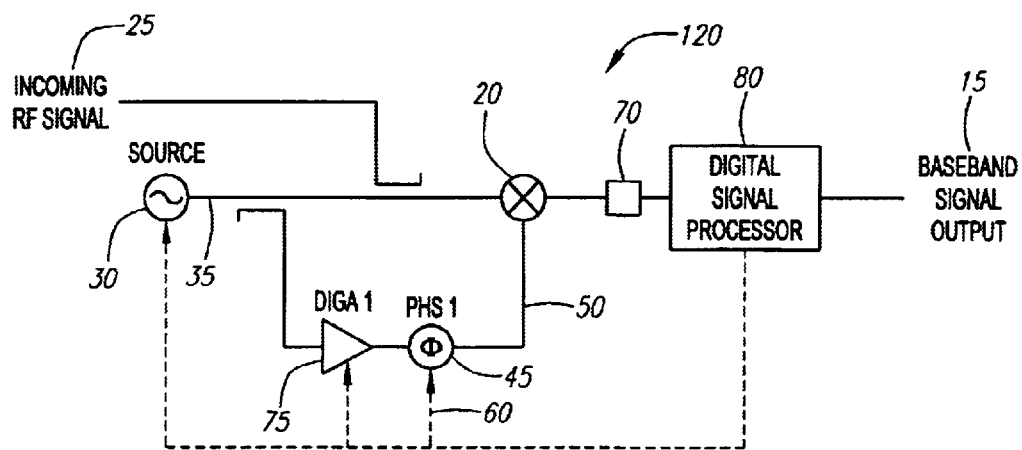
FIG. 4 is a block diagram of a direct downconversion receiver that includes a variable amplifier in the local oscillator path of its mixer according to one embodiment of the invention.
Figure 5:
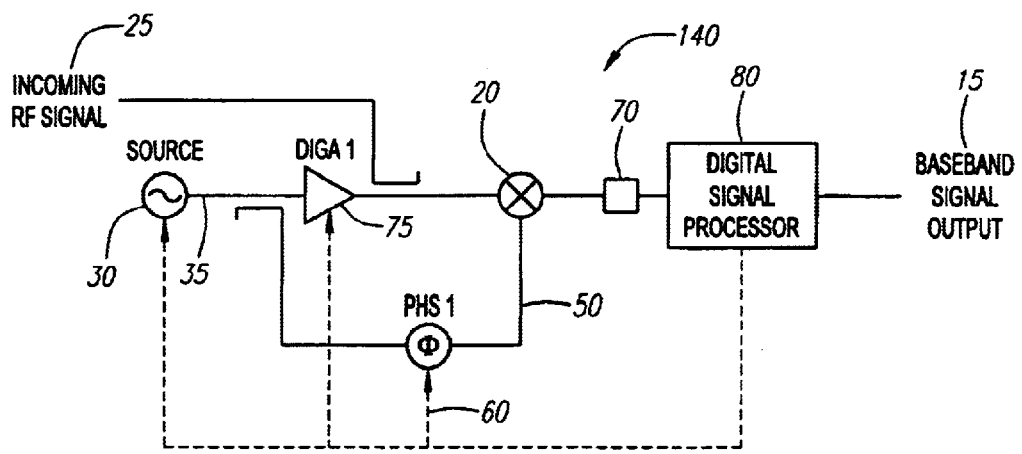
FIG. 5 is a block diagram of a direct downconversion receiver that includes a variable amplifier in the RF path of its mixer according to one embodiment of the invention.
Figure 6:
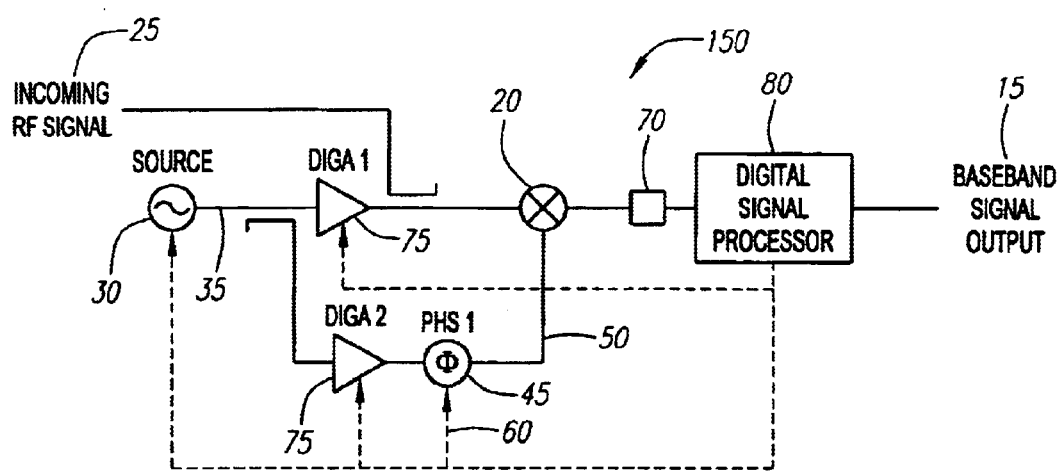
FIG. 6 is a block diagram of a direct downconversion receiver that includes a variable amplifier in both the RF path and LO path of its mixer according to one embodiment of the invention.

Note that the direct downconversion receiver disclosed herein may be implemented in both the in-phase (I) arm and quadrature-phase (Q) arm of an I/Q modulated communication system. It is well known that the gain and phase imbalance between the I and Q arms of a communication system creates images and other unwanted by-products in the demodulated signal. Accordingly, direct downconversion receiver 120 includes a digitally-controlled attenuator 72 to adjust the amplitude of the quadrature local oscillator signal 50 to minimize these images. Turning now to FIG. 4, a digitally-controlled amplifier 75 may be used in place of attenuator 72 to form direct downconversion receiver 120. Amplifier 75 may have either a positive or negative gain to affect the amplitude of quadrature local oscillator signal 50 as necessary. Alternatively, digitally-controlled amplifier 75 may be located to adjust RF output 35 instead as shown for direct downconversion receiver 140 in FIG. 5. In yet another alternative, both signals may be adjusted by a digitally-controlled amplifier 75 as shown in FIG. 6 for direct downconversion receiver 150.

Accordingly, although the invention has been described with respect to particular embodiments, this description is only an example of the invention's application and should not be taken as a limitation. Consequently, the scope of the invention is set forth in the following claims.

What is claimed is:

1. A direct downconversion receiver, comprising:
   an oscillator for providing a local oscillator signal (LO);
   a phase-shifter configured to receive the LO signal and provide a phase-shifted signal that is approximately 90 degrees out of phase with the LO signal; and a mixer having a first input port for receiving both the LO signal and an RF signal and a second port for receiving the phase-shifted signal, the mixer being configured to provide a baseband output signal that is the product of the signals entering the first input port and the second input port.

2. The direct downconversion receiver of claim 1, wherein the phase-shifter is integrated with the mixer.

3. The direct downconversion receiver of claim 1, wherein the LO signal is a sinusoid.

4. The direct downconversion of claim 1, further comprising:
   a controller for detecting a DC offset component in the baseband output signal and controlling the phase-shifter to adjust the amount of phase-shift in the phase-shifted signal so as to minimize the detected DC offset component.

5. The direct downconversion receiver of claim 4, wherein the controller is configured to command the phase-shifter to advance the phase of the phase-shifted signal by a first amount if the detected DC offset component is negative, and wherein the controller is configured to command the phase-shifter to delay the phase of the phase-shifted signal by a second amount if the detected DC offset component is positive.

6. The direct downconversion receiver of claim 5, wherein the first and second amounts are predetermined.

7. The direct downconversion receiver of claim 5, wherein the first and second amounts are adaptive.

8. The direct downconversion receiver of claim 1, further comprising:
   an analog-to-digital converter for digitizing the baseband output signal; and
   a digital signal processor for processing the digitized baseband output signal, wherein a downconverted RF signal may be detected by the digital signal processor at a discrete frequency determined by the difference between the RF signal frequency and the LO signal frequency.

9. The direct downconversion receiver of claim 8, further comprising:
   a first digitally-controlled amplifier for adjusting the gain of the LO signal provided to the phase-shifter, wherein the digitally-controlled amplifier is controlled by the digital signal processor.

10. The direct downconversion receiver of claim 8, further comprising:
    a second digitally-controlled amplifier for adjusting the gain of the LO signal provided to the first input of the mixer, wherein the second digitally-controlled amplifier is controlled by the digital signal processor.

11. A method of directly downconverting an RF signal, comprising:
    (a) phase shifting a local oscillator signal (LO) by approximately 90 degrees to produce a phase-shifted signal;
    combining the RF signal with the LO signal to produce a combined signal; and
    forming the product of the combined signal and the phase-shifted signal to produce a baseband signal output.

12. The method of claim 11, further comprising:
    detecting a DC offset in the baseband signal output, and
    adjusting the amount of phase shift produced by act (a) in the phase-shifted signal to minimize the detected DC offset.

13. The method of claim 11, further comprising:
    digitizing the baseband signal output, and
    (b) processing the digitized baseband signal output to detect a downconverted RF signal.

14. The method of claim 13, wherein act (b) comprises performing a discrete Fourier transform on the digitized baseband signal.

* * * * *